United States Patent Office 3,769,344
Patented Oct. 30, 1973

3,769,344
CARBODIIMIDES FROM OLEFINS, CYANAMIDE AND TERT-BUTYL HYPOCHLORITE
Louis de Vries, Richmond, Calif., assignor to Chevron Research Company, San Francisco, Calif.
No Drawing. Original application June 10, 1968, Ser. No. 735,526, now abandoned. Divided and this application Oct. 22, 1970, Ser. No. 83,198
Int. Cl. C07c *119/04*
U.S. Cl. 260—566 R                    1 Claim

ABSTRACT OF THE DISCLOSURE

Cyanamide is β-chloroalkylated with from 1 to 2 chloroalkyl groups by combining cyanamide, positive chlorine and an ethylene compound under relatively mild conditions in an inert solvent. The products find use as intermediates, sources of guanidine bases, while the carbodiimide products, in addition, find use as catalysts, dehydrating agents, monomers and stabilizing agents.

CROSS REFERENCE TO RELATED APPLICATIONS

This application is a divisional of copending application Ser. No. 735,526, filed June 10, 1968, now abandoned.

BACKGROUND OF THE INVENTION

Field of the invention

Cyanamide is a versatile reactant in providing an active functionality when bonded to an organic radical. The cyanamide can be used to prepare ureas, guanidine, amidino esters, etc.

The carbodiimides are even more versatile than the substituted cyanamides in being extremely reactive and capable of forming a wide variety of functionalities. The carbodiimides can be used as dehydrating agents, oxidizing agents, intermediates for the synthesis of ureas, guanidines, amidino esters and derivatives of these compounds. Carbodiimides can also be used as catalysts, cross-linking agents and as stabilizing agents.

Description of the prior art

Various exotic ways have been used to prepare carbodiimides. Substituted ureas have been dehydrated with $P_2O_5$. Dialkyl carbodiimides have been prepared from the analogous thiourea and mercuric oxide. Meakins et al., J. Chem. Soc., 1957, 993. Aromatic isocyanates have been reacted with phospholine 1-oxides to prepare diaryl carbodiimides. Campbell et al., J. Am. Chem. Soc., 84, 1493 (1962). Other methods of preparing carbodiimides include reaction of alkyl thioureas or alkyl thiocarbamates with hypochlorite and cuprous salts, U.S. Pat. No. 2,905,713, Sept. 22, 1959 and German Pat. No. 1,018,858, Nov. 7, 1957.

Carbodiimides have found use in preparing guanidines, U.S. Pat. No. 2,479,498. They have also been used in cross-linking polymers, U.S. Pat. No. 2,937,164 and as stabilizers for lubricants, Neth. Appl. 65/7,710, Dec. 17, 1965 (C.A. 64 P19289h).

SUMMARY OF THE INVENTION

Cyanamide is contacted with positive halogen and an ethylene compound to form β-chloroalkyl substituted cyanamides or di(β-chloroalkyl) carbodiimides, depending on the ratio of ethylene compound and positive halogen to cyanamide. The reaction is carried out under mild conditions in an inert solvent. A minor amount of di(β-chloroalkyl) cyanamide is formed concomitantly with the carbodiimide.

The products, because of their plurality of functionalities, find a wide variety of uses, particularly as intermediates to other useful compounds.

DESCRIPTION OF THE PREFERRED EMBODIMENTS

Compounds

The compounds which are prepared by the process of this invention will be either chloroalkyl substituted cyanamide or the di(chloroalkyl) carbodiimide. The substituted cyanamide will be considered first.

The substituted cyanamide will, for the most part, have the following formula:

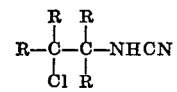

wherein the R's are hydrogen, hydrocarbyl (hydrocarbyl is an organic radical composed solely of carbon and hydrogen, which may be aliphatic, alicyclic or aromatic or combinations thereof, and may be aliphatically saturated or unsaturated, e.g. olefinic or acetylenic), preferably hydrocarbyl free of aliphatic unsaturation, substituted hydrocarbyl, or heteroatom containing functionalities which either inductively or electromerically can stabilize a positive-charge.

The total number of carbon atoms exclusive of the cyanamide radical (hereinafter referred to as aminocyanato) will generally be from 2 to 125 carbon atoms, more usually 2 to 100 carbon atoms. Two R's on the same or adjacent carbon atoms, geminal or vicinal, may be taken together with the carbon atoms to which they are attached to form rings.

With olefins, having no substituents which would reverse the direction of addition, the chlorine will be added to the least substituted carbon atom.

The various functionalities which may be present will now be considered. Any inert functionality may be present which is not in conjugation with the double bond. Such functionalities include halo (fluoro, chloro, bromo and iodo), nitro, oxo-carbonyl, non-oxo carbonyl, oxy (hydroxy and ethereal oxygen), azo, azoxy, sulpho, amino, etc.

When the functionality is in conjugation with or α to the double bond, the functionality must be either inductomerically or electromerically electron inducing. These olefins will be, for the most part, cationic catalysable addition polymerizable olefins. These olefins will generally come within the following formula:

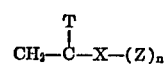

wherein T is hydrogen, alkyl of from 1 to 3 carbon atoms or $—X—(Z)_n$, X is oxygen, nitrogen or sulfur, Z is a hydrocarbon group or an acyl group of from 1 to 20 carbon atoms and *n* is 1 when Z is chalcogen (oxygen and sulfur) and 2 when Z is nitrogen.

Generally, there will be from 1 to 4 heteroatoms in the radical, usually oxygen, nitrogen, halogen or sulfur.

Illustrative compounds include β-chlorohexyl cyanamide, β-chlorododecyl cyanamide, 1,2-dichloroethyl cyanamide, 1-phenyl 2-chloroethyl cyanamide, chlorocholesteryl cyanamide, β-chloropolyisobutenyl cyanamide, β-chloropolyethylene cyanamide, β-chloro - α-butoxyethyl cyanamide, β - chloro-α-ethylthioethyl cyanamide, β-chloro-α-(p.-dimethylaminophenyl) ethyl cyanamide, 2-1-chloro-3-(p.-nitrophenylpropyl)cyanamide, etc.

The carbodiimides which are formed will have the following formula:

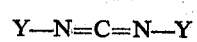

wherein Y is an organic radical of from 2 to 125 carbon atoms, more usually of from 2 to 10 carbon atoms. Y may be β-chlorohydrocarbon or may be substituted with the functionalities indicated above.

Where Y is chlorohydrocarbyl, the carbodiimides will have the following formlua:

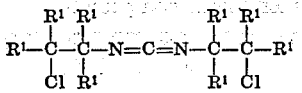

wherein the R¹'s may be the same or different and are hydrogen or hydrocarbon of from 1 to 98 carbon atoms, the total number of carbon atoms in the nitrogen substituent being in the range of about 2 to 100. Two R¹'s may be taken together, either on the same carbon atom or adjacent carbon atoms, to form a ring with the carbon atom(s) to which they are attached.

Illustrative carbodiimides include di(β-chloropentyl) carbodiimide,
di(β-chloroethyl) carbodiimide,
di(2-chlorocyclopentyl) carbodiimide,
di(2-chloro-1-phenylethyl) carbodiimide,
di(β-chloropolyisobutenyl) carbodiimide,
β-chlorodecyl β-chloropolyisobutenyl carbodiimide,
di(β-chloro-α-phenoxyethyl) carbodiimide,
di[2-(4-p.-trifluoromethylphenyl-1-chlorobutyl)] carbodiimide,
di[4-(p.-nitrophenyl-1 and 2-chlorocyclohexyl)] carbodiimide,
di[2-([3-acetylphenyl-1-chloropropyl)] carbodiimide,
di[2-([4-carboethoxy-1-chlorobutyl])] carbodiimide, etc.

Process of preparation

Reactants: The only reactant which governs the structure of the final product is the olefin and, therefore, the olefin will be considered first.

Any olefin can be used which can be dissolved in a suitable solvent or can serve as its own solvent and does not have electron withdrawing groups in conjugation with the double bond. The inoperative olefins are illustrated by acrylates, nitroethylene, etc.

The olefins will be of from about 2 to 125 carbon atoms, more usually of from about 2 to 100 carbon atoms. The olefins may be terminal or internal and may have from 0 to 4 hydrogen atoms bonded to the olefinic carbon atoms.

The olefins may be hydrocarbon, may be mono- or polyolefins, preferably monoolefins, and may be in conjugation with or out of conjugation with electron inducing functionalities. The olefins may be exo or endo in alicyclic compounds. The olefins may be free radical or cationic catalyzed addition polymerizable olefins.

Usually, the olefins which find use will have the following formula:

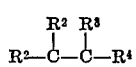

wherein R² is hydrogen or hydrocarbon of from 1 to 120 carbon atoms; if hydrocarbon, usually saturated aliphatic hydrocarbon of from 1 to 100 carbon atoms, preferably hydrogen or alkyl of from 1 to 12 carbon atoms.

R³ is hydrogen or hydrocarbon of from 1 to 120 carbon atoms; if hydrocarbon, usually saturated aliphatic hydrocarbon of from 1 to 100 carbon atoms, or may be taken together with one R² to form a ring of from 3 to 16 annular carbon members, or may be the same as R⁴.

R⁴ is hydrogen, hydrocarbon of from 1 to 12 carbon atoms—aliphatic, aromatic or alicyclic—either aliphatically saturated or unsaturated, usually having from 0 to 1 site of aliphatic unsaturation and may be $X^1—(Z^1)_{n^1}$, wherein $X^1$ is chalcogen (oxygen or sulfur) or nitrogen, $Z^1$ is hydrocarbyl or acyl of from 1 to 20 carbon atoms, usually 1 to 12 carbon atoms, and $n^1$ is 1 when $Z^1$ is chalcogen and 2 when $Z^1$ is nitrogen.

The total number of carbon atoms of $2R^2+R^3+R^4$ is in the range of 0 to 123. The olefins may be terminally or internally unsaturated, preferably terminally. Preferred olefins are when at least 1 of the R²'s is hydrogen.

Illustrative olefins include propylene, hexene, dodecene, cyclohexene, cyclooctene, polyisobutylene, diisobutylene, styrene, α-methylstyrene, norbornene, stilbene, vinyl octyl ether, vinyl hexyl ether, vinyl naphthyl ether, N,N-diethyl vinylamine, phenyl vinyl thioether, etc.

The other reagent is a positive halogen source. By positive halogen is intended halogen bonded to nitrogen or oxygen. These compositions are well known; the oxygen compounds include sodium hypochlorite, tert.-amyl hypochlorite, hypochlorous acid, etc.; the nitrogen compounds include N-chloro succinimide N-chloro N-methyl acetamide, N-chloro N-methyl formamide, etc.

While the reaction may be run neat, depending on the olefin used, it is preferred that an inert organic polar solvent be employed. Various solvents include esters such as methyl acetate, ethyl acetate, tert.-butyl formate, acetone, acetonitrile, nitromethane, etc.

The concentration of the olefin, when a solvent is used, will generally be from 10 to 80 weight percent of the solution.

The temperature for the reaction will generally be in the range of about −25° C. to +30° C., more usually in the range of about −10° C. to +15° C. The time of the reaction is not critical and may vary from about 1 hour to about 24 hours, depending on the reactivity of the olefin, the temperature used, the positive chlorine reagent used, as well as other reaction variables.

The reaction may be run in the presence or absence of air and at atmospheric or at super-atmospheric pressures. When using low-boiling olefins, it may be desirable to use superatmospheric pressure. The reaction may be carried out either batchwise or continuously.

As indicated previously, the ratio of olefin and positive halogen to cyanamide will govern the final product. To prepare the chloroalkylated cyanamide, there will be at least 1 mole of cyanamide per mole of olefin and usually an excess of cyanamide. Generally, from about 1 to 5 moles of cyanamide will be used per mole of olefin. The positive halogen reagent will be used in an amount of from about 1 to 2 moles per mole of olefin, preferably about 1:1 mole ratio.

In the preparation of the carbodiimide, at least 2 moles of olefin will be used per mole of cyanamide and usually not more than 5 moles of olefin per mole of cyanamide. The amount of positive chlorine reagent will generally be from about 2 to 3 moles per mole of cyanamide.

The order of addition of the reagents is not critical. Usually, the positive halogen reagent will not be added in the absence of cyanamide. That is, the olefin and positive halogen reagent will not be added together prior to the addition of cyanamide. Otherwise, the other possible combinations of reactants may be used. All of the reagents may be added initially or, preferably, the olefin and cyanamide are added and the positive halogen reagent then added incrementally.

The workup of the product will follow conventional methods. Conveniently, the solvent and/or excess olefin may be stripped and the organic product separated from inorganic materials, e.g., cyanamide, by extraction with a solvent, such as an aliphatic or aromatic hydrocarbon. The product may then be further purified by conventional means, such as distillation, chromatography, solvent extraction, etc.

EXAMPLES

The following examples are offered by way of illustration and not by way of limitation.

Example I

Into a reaction vessel was introduced 882 g. of $C_{15-20}$ cracked wax α-olefins (better than about 85 weight percent are α-olefins) (3 equivalent weight) and 42 g. of cyanamide (1 equivalent weight) in 450 cc. of ethyl acetate and 200 cc. of benzene. The reaction mixture was cooled to 10° C. and 286 g. of tert.-butyl hypochlorite was added dropwise. Near the end of the addition, the temperature was lowered to 0° C. When the addition was completed, the solvent was stripped at reduced pressure, finally reducing the pressure to 1 mm. Hg and raising the temperature to room temperature.

Analysis of resulting dichloro carbodiimide containing one equivalent of unreacted α-olefin (percent): C, 75.10; H, 11.58; N, 3.04; Cl, 8.84.

Approximately 10 cc. of the residue was dissolved in benzene and added to a large excess of octadecyl amine. The mixture was heated to reflux at 80° C. for 4 hours. The solvent was stripped, the residue washed with meth-anol/sodium methoxide and the methanol removed. The residue was then dissolved in pentane, filtered and dried and the pentane distilled off.

Analysis (crude monochloro guanidine, containing one equivalent of unreacted α-olefin) (percent): C, 77.07; H, 13.38; N, 5.02; Cl, 4.23. Calcd. (percent): C, 77.3; H, 12.6; N, 5.19; Cl, 4.49. Basic nitrogen, 1.44%, mol. wt. (ThermoNAM)-838.

Example II

Into a reaction vessel was introduced 7 g. of cyanamide (1 equivalent weight) 43.1 g. of hexene-1 (3.00 equivalent weights) and 200 cc. of ethyl acetate. The reaction mixture was cooled to 10° C. and 39.7 g. (2.2 equivalent weights of tert.-butyl hypochlorite in 50 cc. of ethyl acetate was added slowly as the temperature was lowered to 0° C. An aliquot of 50 cc. of the above reaction mixture was withdrawn at the end of the addition, the solvent and unreacted hexene stripped under reduced pressure (1 mm. Hg) and the residue extracted with pentane. A cold (0° C.) pentane solution was filtered and the pentane removed.

Analysis (crude dichloro carbodiimide)—Found (percent): C, 51.34; H, 8.08; N, 7.64; Cl, 25.80. Calcd. (percent): C, 55.9; H, 8.68; N, 10.05; Cl, 25.40.

To the balance of the reaction mixture was added a large excess of N-butyl amine and the mixture heated to reflux (80° C.) for 4 hours. The product was then stripped at reduced pressure (1 mm. Hg). The residue was washed with sodium methoxide/methanol mixture and then stripped to remove the volatile materials. The residue was extracted with pentane, the pentane solution fiitered, and then the pentane stripped. The infrared spectrum indicated the presence of the guanidine functionality.

Analysis—Found (percent): C, 64.11; H, 10.02; N, 13.06; Cl, 11.48.

Example III (A) Into a reaction vessel was introduced 980 g. of $C_{15-20}$ cracked wax α-olefins (at least 85 mole percent α-olefin) and 202 g. of cyanamide in 2500 ml. of ethyl acetate. The mixture was cooled to 5° C. and 518 g. of tert.-butyl hypochlorite added slowly over a 6-hour period. During the addition, the temperature was maintained between 0° C. and 5° C. and then was maintained for an additional 16 hours between 5° C. and 15° C. At the end of this time, a vacuum was applied to the reaction mixture, finally reaching a reduced pressure of 2 mm./Hg and the reaction mixture allowed to warm to room temperature.

The residue was diluted with 4 volumes of pentane, filtered and the filtrate was then cooled to 0° C. and filtered and then washed with an aqueous solution of aluminum potassium sulfate. After drying the pentane solution over magnesium sulfate, the pentane solution was filtered and the solvent stripped.

Analysis (crude monochloroalkyl cyanamide) (percent): C, 70.32; H, 10.93; N, 6.17; Cl, 8.18; O, 4.7; mol. wt. (ThermoNAM)-608.

(B) 20 g. of the above product was combined with 7.5 g. of n-butyl amine in 100 ml. of benzene and the mixture refluxed at 80° C. for 4 hours. The solution was washed with water to remove the amine, followed by washing with 5 percent sodium hydroxide and then again with water. The product was then dissolved in methane sulfonic acid and extracted with pentane 3 times. The methane sulfonic acid solubles were washed with 5 percent sodium hydroxide until neutral and then extracted with pentane. The pentane was removed in vacuo leaving the product as a residue. The infrared spectrum indicated the presence of the guanidine functionality.

Analysis (percent): C, 69.43; H, 11.36; N, 8.57.

Example IV

Into a reaction vessel was introduced 7.35 g. of cyanamide in 25 ml. of distilled water, 25 ml. of benzene and 40 ml. of hexene-1 and the mixture heated to 40–45° C. To the reaction mixture was then added 249 g. of a 5.25 weight percent sodium hypochlorite solution. During the course of the addition, the mixture turned deep red but the color substantially faded toward the end of the addition (2½ hours). The reaction mixture was filtered, the aqueous layer removed and the volatiles removed in vacuo at room temperature. The residue was extracted with pentane, and the pentane soluble material isolated by stripping the pentane.

Analysis (percent): C, 51.59; H, 8.38; N, 7.05.

The pentane insoluble residue was soluble in benzene and had the following analysis (percent): C, 47.36; H, 6.77; N, 21.06.

Example V

Into a reaction vessel was introduced 3.82 of cyanamide and 7.55 g. of hexene-1 in 100 ml. of ethyl acetate and the mixture cooled to 5° C. To the reaction mixture was added slowly 9.85 g. of tert.-butyl hypochlorite. At the end of the addition, the volatile material was removed in vacuo and 45 g. of polyisobutylene (0.045 mole) in 100 ml. of benzene was added and the mixture cooled again to 5° C. To this mixture was then added 9.85 g. of tert.-butyl hypochlorite.

At the end of the addition, the volatile material was stripped, the residue dissolved in pentane and precipitated with methanol. The solution in pentane and precipitation with methanol was repeated for a total of 3 times. The resulting product had the following analysis (percent): C, 81.21; H, 13.44; N, 0.77; Cl, 4.22. (An infrared spectrum indicated the presence of carbodiimide.)

Example VI

Into a reaction vessel was introduced 4.35 g. of cyanamide in 5 ml. of ethyl acetate and 11.2 g. of tert.-butyl hypochlorite in 20 cc. of ethyl acetate. Cooling was necessary to maintain temperature below about 25° C. When the addition of tert.-butyl hypochlorite was completed, 31.2 g. of diisobutylene was added dropwise. Cooling was again necessary initially. The mixture was then allowed to stir for 18 hours at room temperature. A product was obtained weighing 5.11 g. The infrared spectrum showed the substantial absence of the nitrile peak.

Example VII

Into a reaction vessel was charged 13.3 of N-chlorosuccinnimide, 75 ml. of tert.-butyl alcohol, 1.12 g. of potassium tert.-butoxide and 11.2 g. diisobutylene. To the mixture was added 8.4 g. of cyanamide in 50 cc. of tert.-butyl alcohol. A reddish oil formed during the addition. Stirring was continued for 16 hours at room temperature. The solution was then filtered and the solvent and unreacted diisobutylene were stripped at reduced pressure. The benzene soluble product showed the typical strong cyanamide bands in the infrared spectrum at 3180 cm.$^{-1}$ and 2210 cm.$^{-1}$.

Example VIII

Into a reaction vessel was introduced 1,000 g. of polyisobutylene (1 mole) and 126 g. of cyanamide dissolved in 2,400 ml. of 2-ethylhexyl acetate. The solution was hazy and 100 cc. of ethyl acetate was added. The mixture was then cooled to 3° C. and a solution of 325.7 g. of tert.-butyl hypochlorite in an equal volume of 2-ethylhexyl acetate was added dropwise while maintaining the temperature at 3° C. When the addition was complete, the reaction mixture was stirred at 3° C. for 2 hours.

The reaction mixture was then diluted with 1 volume of pentane and filtered. The filtrate was further diluted with 4 volumes of pentane and treated with Norite A, the Norite A being removed by filtration. The pentane was then removed in vacuo at room temperature.

Analysis: N, 0.26%.

To the reaction mixture was added 19.2 g. of methane sulfonic acid and 219.4 g. (2 equivalent weight of butyl amine). The reaction mixture was allowed to stand for 16 hours, then heated at 70° C. for 7 hours. A Mid-Continent SAE 30 oil was then added to a major portion of the product and volatiles stripped in vacuo. Total nitrogen (neat), 0.90%; basic nitrogen (neat), 0.22%.

Example IX

Into a reaction vessel was introduced 6.1 g. of cyanamide in 50 ml. ethyl acetate and 8.73 g. of diisobutylene. After cooling the solution to —10° C., 7.9 g. of tert.-butyl hypochlorite in 15 ml. ethyl acetate was slowly added. After completion of the addition, the mixture was stirred for an additional hour at —10° C. and then allowed to warm to room temperature and held at that temperature for a period of 16 hours. The volatile material was then removed in vacuo, the residue dissolved in pentane and washed with water. The pentane was evaporated, leaving a residue of 4.25 g.

A small portion of the crude product was sublimed.

Analysis (monochloro-diisobutylene - cyanamide adduct) (percent): C, 57.31; H, 8.78; N, 14.82; Cl, 18.83. Calcd. (percent): C, 57.4; H, 9.10; N, 14.85; Cl, 18.80.

Example X

Into a reaction vessel was introduced 21.0 g. of cyanamide and 28.7 g. of hexene-1 in 200 ml. of ethyl acetate. The mixture was cooled to 5° C. and 54.2 g. of tert.-butyl hypochlorite was added slowly. The reaction mixture was stirred at 5° C. for an additional 1 hour after the completion of the tert.-butyl hypochlorite addition.

An aliquot of 50 ml. was taken and the volatile materials removed in vacuo. The residue was extracted with cyclohexane, the remaining residue extracted with benzene, the benzene solution isolated and the benzene stripped. The benzene soluble residue was extracted with cyclohexane and the cyclohexane solutions combined. The cyclohexane was then stripped in vacuo.

Analysis (percent): C, 46.69; H, 6.6; N, 22.52; Cl, 22.08.

To the balance of the reaction mixture was added a large excess of n-butyl amine and the mixture heated to reflux (80° C. for 4 hours). At the end of this time, all volatile material was stripped in vacuo (1 mm./Hg). The residue was dissolved in methanolic sodium methoxide solution and the methanol stripped. The residue was extracted with pentane, the pentane insoluble residue being extracted with benzene. The benzene extract was stripped and the residue isolated.

Analysis (percent): C, 64.10; H, 10.33; N, 17.83; Cl, 2.30.

Example XI

Into a reaction vessel was introduced 11 g. of cyanamide (0.26 ml.) in 2 ml. of ethyl acetate and 80 g. of styrene (0.785 mole). The solution was cooled to 0° C. and 62.5 g. of tert.-butyl hypochlorite in 50 ml. of ethyl acetate was added dropwise. Vigorous reaction was noted with strong evolution of heat. The temperature was maintained at 10° C. by cooling. At the end of the addition, the reaction mixture was allowed to slowly warm to room temperature. The solvent was then removed with any other volatiles present by slowly reducing the pressure to 1 mm./Hg at room temperature. From the infrared spectrum it appeared that in addition to the 1:1 adduct, a significant amount of styrene had been telomerized to provide polystyryl substituents on the cyanamide.

EXAMPLE XII

Into a reaction vessel was introduced 10 g. of cyanamide in 100 ml. of ethyl acetate and 51.2 g. of vinyl ethyl ether and the solution cooled to 2° C. To the solution was then added a solution of 56.5 g. of tert.-butyl hypochlorite in 50 ml. of ethyl acetate. A vigorous reaction was noted with evolution of heat, the temperature being maintained below 5° C. At the end of the addition, the mixture was allowed to warm to room temperature. The infrared anlysis showed a strong carbodiimide peak.

Utility

Carbodiimides find a wide variety of uses. They can be used to initiate polymerizations of isocyanates; they can be used to form strong nitrogen bases such as guanidines; they can be employed as cross-linking agents with acid group containing polymers, as well as intermediates for the synthesis of organic compounds.

The alkylated cyanamides can be used in the preparation of guanidines which are useful strong organic bases. Alternatively, the cyanamide products can be used to modify polymers to prepare mixed ureas and thioureas and as a source of soil nutrient. Because of the β-chlorine atoms both the cyanamides and the carbodiimides are at the same time nitrogen mustards and as such quite unusually reactive as alkylating agents. Therefore therapeutic and insecticidal applications are reasonable applications.

As will be evident to those skilled in the art, various modifications on this invention can be made or followed, in the light of the foregoing disclosure and discussion, without departing from the spirit or scope of the disclosure or from the scope of the following claim.

I claim:

1. A method for preparing β-chloroalkyl-substituted carbodiimide which comprises contacting an olefin selected from the group consisting of hexene-1, $C_{15-20}$ cracked wax α-olefins polyisobutylene, having up to 125 carbon atoms vinyl ethyl ether and styrene, with cyanamide, and adding a positive chlorine source in the ratio to said cyanamide of 2–3:1 at a temperature in the range of —25° C. to +30° C., wherein the mol ratio of cyanamide to said olefin is 1:2–1:5.

References Cited

UNITED STATES PATENTS 3,129,245    4/1964    Forman _____ 260—566

OTHER REFERENCES

Hunger, Tetrahedron Letters, pp. 5929–31 (1966).

HARRY I. MOATZ, Primary Examiner

U.S. Cl. X.R.

260—551 C; 553 R; 465 A; 71—320